United States Patent [15] 3,639,782

Lord [45] Feb. 1, 1972

[54] MAGNETIC SLAVE GATING CIRCUIT FOR FULL WAVE PHASE-CONTROLLED THYRISTOR CIRCUITS

[72] Inventor: Harold W. Lord, Mill Valley, Calif.

[73] Assignee: General Electric Company

[22] Filed: June 1, 1970

[21] Appl. No.: 42,391

[52] U.S. Cl. ....................307/252 T, 307/252 N, 307/305, 307/314

[51] Int. Cl. ....................H03k 17/00

[58] Field of Search ....................307/252.73, 252.21, 252.70, 307/252.90, 314, 305

[56] References Cited

UNITED STATES PATENTS

| | | | |
|---|---|---|---|
| 3,018,383 | 1/1962 | Ellert | 307/252 T |
| 3,176,150 | 3/1965 | McMurray | 307/252 T |
| 3,443,204 | 5/1969 | Baker | 307/252 T |
| 3,299,344 | 1/1967 | Werts | 307/252 T |

*Primary Examiner*—Donald D. Forrer
*Assistant Examiner*—David M. Carter
*Attorney*—John F. Ahern, Paul A. Frank, Julius J. Zaskalicky, Donald R. Campbell, Frank L. Neuhauser, Oscar B. Waddell and Joseph B. Forman

[57] ABSTRACT

A relatively simple magnetic gating circuit for phase-controlled inverse-parallel thyristors has a small error between control and slaved gating pulses. A nonlinear inductor is reset in the phase delay angle before the master SCR conducts and saturates at the same angle in the opposite half cycle to supply gating current to the slave SCR. For a reactive load, this basic circuit provides clipped alternating current gating signals to a saturable gate transformer which selectively supplies gate current to a pair of inverse-parallel high-power thyristors connected for example to a power transformer. A magnetic phase control circuit is shown for the low-power master thyristor. An application is a single phase or polyphase heater control.

3 Claims, 4 Drawing Figures

Inventor:
Harold W. Lord,
by Donald R. Campbell
His Attorney.

Inventor:
Harold W. Lord,
by Ronald R. Campbell
His Attorney.

MAGNETIC SLAVE GATING CIRCUIT FOR FULL WAVE PHASE-CONTROLLED THYRISTOR CIRCUITS

This invention relates to a magnetically controlled thyristor power circuit for supplying full wave phase-controlled voltage to resistive or reactive loads in response to a half wave control signal, and more particularly to a relatively simple magnetic phase control circuit for such applications having only a small error between the control and slaved gating signals.

In a slaved firing or gating circuit for thyristors, such as a pair of inverse-parallel connected silicon controlled rectifiers, an externally generated gating signal renders conductive a "-master" thyristor at a selected phase of the alternating current supply, and during the other half cycle the conditioned slaved gating circuit renders conductive the "slave" thyristor at approximately the same phase angle. The use of a simple RC-diode circuit to obtain the slaving action is described on page 69 of the Silicon Controlled Rectifier Manual, 4th edition, published by the General Electric Company, Semiconductor Products Department, Electronics Park, Syracuse, New York (copyright 1967). Application of this type of slaved triggering to control the voltage applied to the primary winding of a power transformer is not satisfactory, however, because it does not provide sufficient symmetry of firing angle, i.e., the "slave" thyristor does not follow the "master" thyristor by 180°. As a result, the residual DC component in the voltage applied to the transformer causes it to draw high peaks of exciting current. Although the effect of this deficiency upon the exciting current can be overcome to some extent by using a transformer with low flux density and an airgap core, this is an expensive solution.

My prior U.S. Pat. No. 3,350,622 granted Oct. 31, 1967 describes a phase controlled power converter circuit utilizing a saturable reactor slaved with a silicon controlled rectifier. During the portion of the half cycle before the thyristor conducts, the forward blocking voltage is applied to the saturable reactor as a reset voltage. The saturable core is reset to a flux level such that the saturable reactor delays the application of current to the load for the same phase angle in the opposite half cycle. The core then saturates and it conducts load current for the remainder of the half cycle. The present invention is directed in a general sense to an improvement over this patented circuit, which is not suitable for supplying phase-controlled voltage to a reactive load because of the reaction between the exciting current of the transformer and the saturable reactor.

Accordingly, an object of the invention is to provide a magnetically controlled slave gating circuit for use in full wave phase-controlled thyristor circuits characterized by relative simplicity and symmetry between the gating signals applied to the thyristors in opposite half cycles of the supply voltage.

Another object is an improved low cost single or polyphase power circuit utilizing a slaved magnetic firing circuit to control a pair of thyristor switches, suitable to deliver phase controlled voltage to a power transformer connected for example to a heater load.

In accordance with the invention a full wave phase-controlled thyristor circuit comprises first and second thyristor devices, or other appropriate solid-state switching devices, connected in inverse-parallel relationship, and a phase variable gating circuit provide control gating pulses to render conductive the first or master thyristor at a selected phase delay angle in one half cycle of the supply voltage. A nonlinear inductor with a saturable core is effectively coupled across the load terminals of both thyristors so as to be reset by the supply voltage during the phase delay angle before the master thyristor conducts. Coupling means applies the slaved gating pulse developed when the nonlinear inductor saturates in the other half cycle to render conductive the slave thyristor at approximately the same phase delay angle. With a reactive load such as the primary winding of a power transformer, a gate transformer, preferably with a saturable core, is connected in series with the inverse-parallel pair of thyristors and a resistor (to keep the load predominately resistive) across a source of control voltage. Secondary windings on the gate transformer are connected to the gating circuits of another pair of higher power inverse-parallel thyristors which supply phase controlled load voltage to the power transformer. Blocking means in the power thyristor gating circuits couples to each power thyristor only one polarity of the alternating current phase control signals generated in the gate transformer by the alternating conducting master and slave thyristors. In this circuit, small exciting current asymmetries due to small errors in the firing angles of the power thyristors cannot react with the nonlinear inductor and thereby magnify the error.

The foregoing and other objects, features, and advantages of the invention will be apparent from the following more particular description of several preferred embodiments of the invention, as illustrated in the accompanying drawings wherein.

Figure 2:
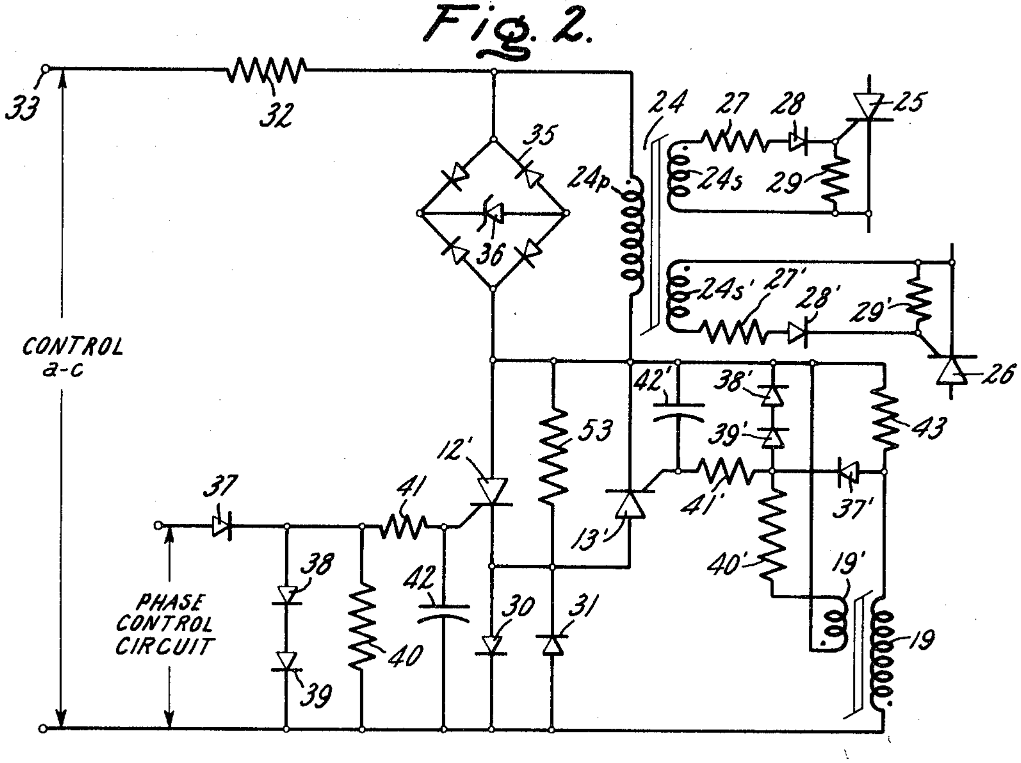
FIG. 2 is a detailed schematic circuit diagram of another embodiment of the invention useful as a gating circuit for a pair of power thyristors to deliver large currents to a reactive load.
Figure 3:
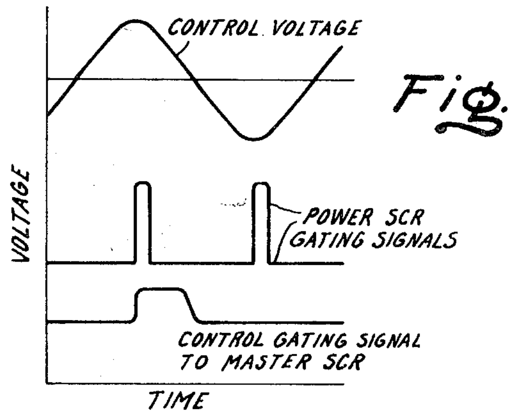
Figure 4:
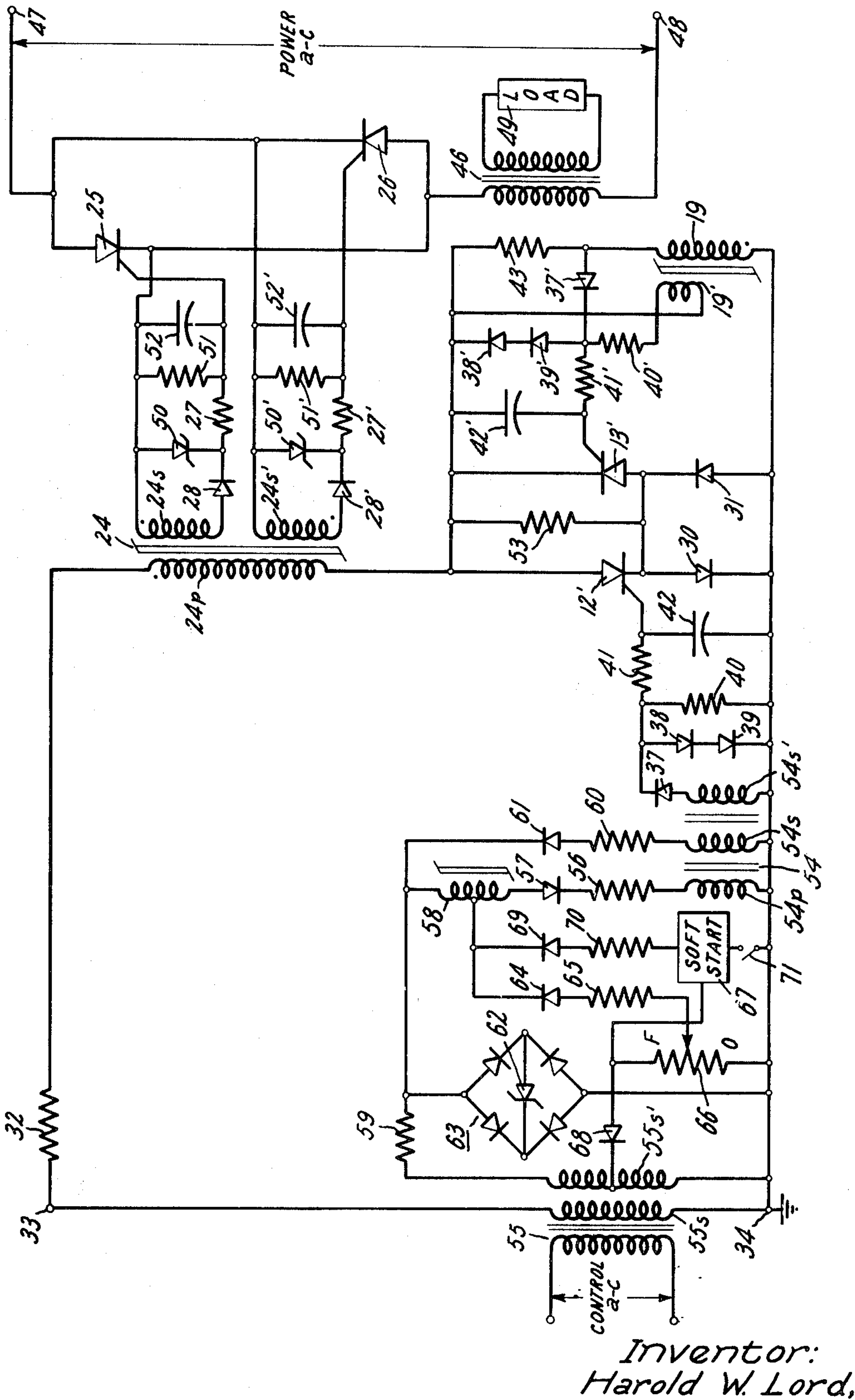

FIG. 3 is a series of waveform diagrams useful in explaining the operation of the FIG. 2 circuit and illustrating, respectively, the gating signal to the low power master thyristor, the two gating pulses for a pair of power thyristors, and the AC control voltage; and FIG. 4 is a modification of FIG. 2 and shows the complete detailed circuit diagram, including a magnetic gating circuit for the low power master thyristor, of the preferred embodiment of the invention for supplying full wave phase controlled voltage to a power transformer connected to a heater load.

Figure 1:
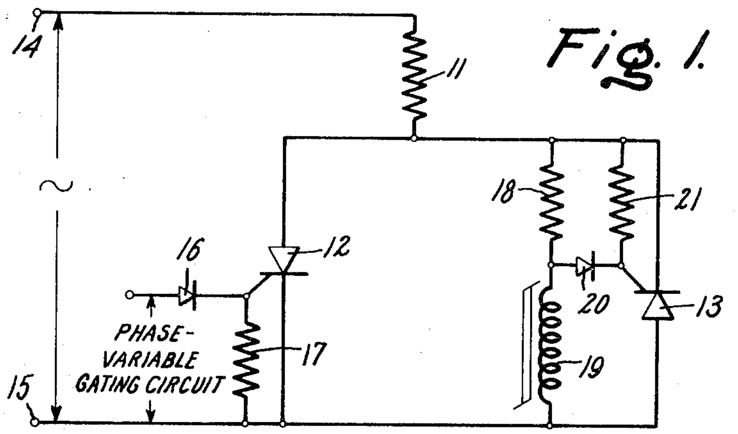
FIG. 1 is a schematic circuit diagram of the basic phase control full wave thyristor power circuit for a resistive load, including a magnetic slave gating circuit constructed in accordance with the teaching of the invention.

The basic circuit shown in FIG. 1 employs a magnetically controlled thyristor slave firing circuit and supplies phase controlled full wave voltage to the load in response to a half wave control. The power circuit comprises essentially a resistive load 11 coupled in series circuit relationship with a pair of inverse-parallel connected thyristors 12 and 13, and this series circuit in turn is connected between a pair of input terminals 14 and 15 adapted to be energized by a source of alternating current potential such as a commercially available 60 Hz. voltage. Thyristors 12 and 13 are preferably silicon controlled rectifiers, although the invention can be practiced with other unidirectional conducting solid-state switching devices such as the silicon controlled switch or a triac device operated in the unidirectional conducting mode. As is well known, the silicon controlled rectifier (SCR) is a reverse-blocking triode thyristor with unidirectional conducting characteristics. Conduction through the SCR from the anode to the cathode is initiated by the application of a gating signal to the gating control electrode of the device, but thereafter the gating electrode loses control over the conduction, and to commutate or turn off the device, it is necessary to reduce the current through the device below the holding current or to make the anode potential negative relative to the cathode potential. Although commutation circuits are commonly employed to switch the SCR from its low impedance conducting state to its high impedance nonconducting condition, the natural line commutation which occurs at the current zero is utilized in the circuits herein described.

An appropriate phase-variable gating circuit is coupled through a blocking diode 16 to the gate circuit of SCR 12, which is the "master" thyristor and has a bias resistor 17 connected directly between the cathode and gate terminals. During the half cycle of the alternating current source when terminal 14 is positive with respect to terminal 15, a positive gating pulse generated by the phase-variable firing circuit at the selected phase delay angle supplies gate current to trigger SCR 12 from the high impedance blocking state to the low-impedance conducting state. To generate phase controlled gating current for SCR 13, which is the "slave" thyristor, a slaved gating circuit is provided comprising the series combination of a resistor 18 and a nonlinear inductor or saturable reactor 19 connected in series circuit relationship across the anode and cathode terminals of SCR 13. To complete the gating circuit for SCR 13, the junction of resistor 18 and nonlinear inductor 19 is coupled to the gate electrode by a blocking diode 20, and a bias resistor 21 is connected between the gate and cathode terminals. This slaved gating circuit supplies gate current to SCR 13 during the negative half cycle of the alternating current source at approximately the same phase delay angle at which master SCR 12 was rendered conductive in the opposite half cycle.

During the portion of the half cycle when master SCR 12 is blocking forward voltage, before being rendered conductive at the selected phase angle, the circuit voltage is applied across the series combination of resistor 18 and nonlinear inductor 19, where resistor 18 has a relatively low resistance value compared with the unsaturated impedance of nonlinear inductor 19. Nonlinear inductor 19 preferably has a core made of a rectangular hysteresis loop material, though this is not essential. Assuming that nonlinear inductor 19 was driven to negative saturation during the previous half cycle, during the forward voltage blocking interval the flux is reset to an intermediate value as determined by the volt-time area. During this phase delay interval, nonlinear inductor or saturable reactor 19 has a comparatively large impedance and only the exciting current flows through load 11 and resistor 18, hence essentially all of the supply voltage is impressed upon it. Upon being rendered conductive there is essentially a short circuit between the load terminals, i.e., the anode and cathode, of master thyristor 12, and the flux in nonlinear inductor 19 is locked at a substantially constant value during the remainder of the reset half cycle. In the following half cycle when forward voltage is applied to slave SCR 13, the applied voltage is initially absorbed by nonlinear inductor 19, and the volt-time area required to return the core to negative saturation corresponds to the volt-time area of the previous half cycle reset voltage. Consequently, the exciting current through nonlinear inductor 19 is insufficient to produce a voltage across resistor 18 which will trigger slave SCR 13 until the nonlinear inductor saturates at approximately the same time delay from the start of this half cycle that master SCR 12 was delayed during the preceding half cycle. Due to the rectangular loop hysteresis characteristics, nonlinear inductor 19 switches rapidly from a high-impedance state to a low-impedance conducting state and supplies sufficient current through diode 20 to the gating circuit of slave SCR 13 to render it conductive. Load current is then supplied through SCR 13, rather than through nonlinear inductor 19. In each half cycle, SCR 12 or SCR 13 remains conductive until line commutated off at the natural current zero. Further explanation of the slaving action of nonlinear inductor 19 is given in the previously mentioned U.S. Pat. No. 3,350,622.

The basic full wave phase control power circuit shown in FIG. 1 has the advantages of being controlled by a relatively simple slave triggering circuit which produces only a small error between the gate pulse applied to the gate of master SCR 12 and the slave gate pulse applied to the gate of SCR 13. The error in electrical degrees is quite small when load 11 is predominantly resistive. Due to the reaction between the exciting current of the transformer and nonlinear inductor 19, the performance of the circuit is not as good with a transformer load or with a reactive load in general. The circuit shown in FIG. 2 gives excellent firing characteristics with a reactive load, and utilizes a pair of phase-controlled high-power thyristors whose gate circuits are supplied with phase control gating signals produced by low power master and slave thyristors arranged as shown in FIG. 1. By using a small saturating gate transformer between the pairs of low power and high power thyristors, small exciting current asymmetries due to small errors in the firing angles of the high power thyristors cannot react with the slaved nonlinear inductor and thereby magnify the error.

Referring to FIG. 2, inverse-parallel connected low power master SCR 12' and slave SCR 13' in this circuit are connected in series circuit relationship with the primary winding **24*p* of a gate transformer 24. Gate transformer 24 has two secondary windings 24*s* and 24*s*', each respectively connected to the gate circuits of a pair of high-power thyristors 25 and 26. Although the complete load circuit is not shown here, high-power thyristors 25 and 26, which also are preferably silicon controlled rectifiers, are arranged in inverse-parallel relationship and connected in series with either a resistive load or a reactive load such as the primary winding of a power transformer. The gate circuit of high power thyristor 25 comprises, for example, a resistor 27 and a blocking diode 28 connected in series circuit relationship with secondary winding 24*s* between the gate and cathode of the thyristor, and a bias resistor 29 also connected between gate and cathode. The gate circuit for high power thyristor 26 includes similar components designated by corresponding primed numerals, however the polarities of windings 24*s* and 24*s*' and of blocking diodes 28 and 28' are reversed so that the proper polarity high power thyristor gating pulse is supplied only to the appropriate thyristor when its anode voltage is positive. Gate transformer 24** preferably employs a saturable core of rectangular hysteresis loop material to limit the duration of the gate current to some predetermined maximum value.

Gate transformer primary winding **24*p* and lower power master and slave SCR's 12' and 13' are further connected in series circuit relationship with a pair of back-to-back diodes 30 and 31 and a current limiting resistor 32 between a pair of input terminals 33 and 34 that are adapted to be connected across a source of control AC voltage. A high-resistance 53 is connected in parallel with SCR's 12' and 13'. In order to supply the high-power thyristor gating circuits with a quasirectangular voltage, there is connected across the primary winding 24*p* of the gate transformer a diode bridge rectifier 35 having a Zener diode 36 coupled between one set of diagonals. The nominal sine wave control voltage energizing gate transformer 24 is clipped by the Zener diode 36 and associated bridge rectifier 35 during a substantial portion of each half cycle, and thereby limits the gate transformer secondary winding output crest voltage and peak gate current to substantially constant amplitude over much of the phase control range. This permits a firing circuit design which covers a wide range of phase delay without exceeding the peak current and maximum voltage ratings of high-power SCR's 25 and 26** at the crest of the AC sine wave control voltage.

FIG. 2 shows the details of a practical gating circuit that may be required to regulate the current and provide bias because of the high gate sensitivity of the low power master and slave SCR's 12' and 13', which by way of example can be the GE C106–B1 low power thyristor described on page 422 of the previously mentioned SCR Manual. These thyristors, with a rating of 2 amperes RMS and 200 volts, are low cost and have high gate sensitivity. The gate circuit for master SCR 12' includes, in addition to back-to-back diodes 30 and 31, in the order named, a series blocking diode 37, two series diodes 38 and 39 connected between the gate of SCR 12' and the cathode of diode 30, a bias resistor 40 connected between the gate and the cathode of diode 30, a series resistor 41, and a small capacitor 42 connected between the gate and the cathode of diode 30. Similarly poled diodes 38 and 39 limit the gate-to-cathode voltage to two diode drops, or about 1.4 volts, while small capacitor 42 provides protection against line transients and other *dv–dt* phenomenon. The previously mentioned back-to-back diodes 30 and 31 in series with master SCR 12', and parallel connected resistor 53, provide a cathode bias voltage for this thyristor, as is known in the art. When forward voltages are applied to master SCR 12', the current through resistor 53 and the leakage current through the thyristor flow through diode 30 to provide a small reverse bias between cathode and gate during the interval before the thyristor is rendered conductive. Reversely poled diode 31 is effective during the negative half cycle to provide a shunt path for load current. The gate circuit for slave SCR 13′ is similar, but not identical, and corresponding components are indicated by the same primed numerals. In this circuit the junction of nonlinear inductor 19 and a resistor 43, which corresponds to the resistor 18 in FIG. 1, is connected to the anode of blocking or steering diode 37′. However, nonlinear inductor 19 has an extra winding 19′ of a few turns whose purpose is to supply a small bias voltage between gate and cathode of slave SCR 13′ to make it much less sensitive to being triggered by spurious transient voltages. To this end, bias resistor 40′, instead of being connected directly to the cathode, is connected to the cathode through extra winding 19′. During the half cycle in which forward voltage is applied to slave SCR 13′, the voltage developed across extra winding 19′ in the interval before the saturation of nonlinear inductor 19 has a polarity such that the gate electrode is biased negative with respect to the cathode.

To briefly review the operation of the FIG. 2 circuit, referring also to the waveform diagrams in FIG. 3, during the half cycle when the control AC voltage is positive at terminal 33 with respect to terminal 34, low-power master SCR 12′ initially blocks forward voltage. The circuit voltage is at this time applied to the series combination of resistor 43 and nonlinear inductor 19, and the flux in the core of nonlinear inductor 19 is reset from negative saturation to an intermediate value dependent upon the volt-time product. At the selected phase angle, a positive gating pulse generated by a suitable phase control circuit is coupled through diode 37 and resistor 41 to the gate electrode of low power master SCR 12′, rendering it conductive. In this interval before triggering, the exciting current of nonlinear inductor 19, flowing through the primary winding 24*p* of gate transformer 24, is insufficient to trigger high power SCR's 25 and 26. A quasirectangular gate pulse (due to the clipping action of Zener diode 26 and associated bridge rectifier 35) is generated, however, when master SCR 12′ is rendered conductive, and the voltage developed across secondary gate transformer 24*s* has a polarity such that blocking diode 28 is forward biased and couples the gate pulse to the gate of high-power SCR 25, rendering it conductive. Diode 28′ in the gating circuit for the other high power SCR 26 is reverse biased at this time. Because of the saturation of the rectangular loop core of gate transformer 24, the gating signal supplied to high power SCR 25 has a relatively short duration. Assuming that the timing of the control gating signals and high power SCR gating signals is such that the phase delay angle is about 90° as illustrated in FIG. 3, load voltage is supplied to the load for the remaining 90° of that half cycle or until the natural current zero of the load. Master SCR 12′ is line commutated at the natural voltage zero of the control voltage since a rectangular hysteresis loop core material cannot store electromagnetic energy.

In the opposite half cycle of the control voltage, during which forward voltage is provided for slave SCR 13′, nonlinear inductor 19′ initially presents a high impedance. During this time, extra winding 19′ supplies a reverse bias voltage for the cathode-gate of SCR 13′ in the manner previously explained. At approximately the same phase angle at which master SCR 12′ become conductive in the preceding half cycle, delayed only by a small error angle of a few degrees, nonlinear inductor 19 is driven into saturation and switches into its low-impedance condition. A sharply rising gate current pulse is applied through nonlinear inductor 19, diode 37′, and resistor 41′ to the gate electrode of slave SCR 13′, triggering it into conduction. The bias voltage generated by extra winding 19′, of course, is terminated when the core of nonlinear inductor 19 saturates. The turning on of slave SCR 13′ applies a quasirectangular voltage pulse to gate transformer 24, which is coupled through secondary winding 24*s*′ and diode 28′ to the cathode-gate of high-power SCR 26, rendering it conductive to deliver current to the load. The gate pulse provided by gate transformer 24 terminates when the core of the transformer is saturated, and the timing of the gate pulse initiated by the turning on of slave SCR 13′ is delayed from the gate pulse generated by the turnoff of master SCR 12′ by about 180°, as is evident in FIG. 3. For a 60 Hz. source, measurements showed that at the maximum phase advance for maximum output voltage the "slave" pulse is late by only about 0.2 milliseconds or 4.3 electrical degrees. At 90° and the maximum retard firing conditions, the slave pulse is late by less than about 0.1 milliseconds or about 2 electrical degrees. These errors are much less than the errors for other relatively simple slave triggering circuits, thereby greatly reducing the direct voltage component applied to the load.

FIG. 4 is a detailed circuit diagram of the preferred embodiment of the invention for supplying full wave phase-controlled voltage to the primary winding of a power transformer, utilizing the new magnetically controlled phase control firing circuit. FIG. 4 is a modification of FIG. 2, but also includes a magnetic gating circuit for providing half wave gate pulses to the gate circuit of master SCR 12′. In the power circuit controlled by high-power SCR's 25 and 26, these inverse-parallel thyristors are connected in series circuit relationship with the primary winding of a power transformer 46, the series circuit so formed being connected between power AC terminals 47 and 48. The load 49 connected to the secondary winding of power transformer 46 is typically a power resistor for heating applications or a rectifier supplying direct current to an electronic heater. The gate circuits of high-power SCR's 25 and 26 are shown in greater detail than in FIG. 2, with added components to reduce the sensitivity of the gating circuits and prevent spurious firing. The two gate circuits are identical, however secondary winding 24*s*′ is wound in the reverse direction from secondary winding 24*s* as is indicated by the polarity dots. A Zener diode 50, connected between the dot end of secondary winding 24*s* and the junction of blocking diode 28 and resistor 27, and oppositely poled Zener diode 50′ in the other gate circuit performs the same voltage clipping function and replaces Zener diode and associated bridge rectifier 35 in the FIG. 2 circuit. Additionally, a bias resistor 51 and a small capacitor 52 are connected between the cathode and gate of high power SCR 25, and resistor 51′ and capacitor 52′ are similarly added to the gating circuit of high power SCR 26. In the low-power slave triggering circuit comprising master SCR 12′ and slave SCR 13′, as in FIG. 2, the relatively large resistor 53′ between the cathode and anode of slave SCR 13′ allows sufficient current flow through back-to-back diodes 30 and 31 to provide a bias voltage, but which current is insufficient to cause any substantial change in the flux of gate transformer 24. The circuit as thus described operates in essentially the same manner as FIG. 2, and further description is not believed to be necessary.

The magnetic phase control circuit illustrated to the left of diode 37 in FIG. 4 produces half wave phase-controlled gating pulses for the gating circuit of master SCR 12′. Blocking diode 37 more particularly is connected in series with secondary winding 54*s*′ of a low-power gate current transformer 54, one terminal of which is connected to grounded terminal 34 of the secondary circuit of a control voltage transformer 55. A first secondary winding 55*s* is connected between the control AC voltage input terminals 33 and 34, and an additional tapped secondary winding 55*s*′ is the power supply for the magnetic phase control circuit. The primary winding 54*p* of low-power gate transformer 54 is connected in series with a resistor 56, a blocking diode 57, a tapped saturable reactor 58, and a current limiting resistor 59 across power supply secondary winding 55*s*′. To provide a reset or bias winding for gate transformer 54, secondary winding 54*s* is connected in series with a resistor 60, a blocking diode 61, and resistor 59 across control voltage transformer secondary winding 55 *s*′. In order to provide a quasirectangular wave gating pulse, a Zener diode 62 and associated diode bridge rectifier 63 are connected through resistor 59 across the ends of control voltage transformer secondary winding 55*s*′.

Phase control of the quasirectangular gating pulse is obtained by applying a variable reset voltage to saturable reactor 58. To this end, the tap of saturable reactor 58 is coupled through a blocking diode 64 and resistor 65 to the movable pointer of a potentiometer 66. To provide half wave energization for potentiometer 66, one end is connected to grounded input terminal 34, while the other end is coupled through a blocking diode 68 to the tap of control voltage transformer secondary winding 55s'. Setting the potentiometer 66 pointer at the 0" position cuts off the firing of master SCR 12'. Rotating the pointer toward the "F" end advances the phase of the gate voltage to SCR 12', reaching a maximum phase advance near the F end of the potentiometer for maximum output to the load. An override cutoff control keying circuit is implemented by the series combination of another blocking diode 69, a resistor 70, and a soft-start keying circuit 67. Soft-start keying circuit 67 is a conventional circuit including, for instance, the series combination of a resistor and a capacitor for slowly applying at a predetermined rate a negative polarity voltage to the lower end of resistor 70, thereby increasingly inhibiting the resetting of saturable reactor 58 until the reset voltage as determined by the setting of potentiometer 66 is reached. This application of turn-on control voltage may be in response to the opening of a switch 71 or of a pair of relay contacts. When it is desired to cut off the control voltage, the closure of the switch 71 can be made to connect the lower end of resistor 70 to the common ground line 34 and thereby interrupt the power to the load within less than two cycles of the power supply frequency.

In the operation of the magnetic phase control circuit for producing gate pulses for low-power master SCR 12', potentiometer 66 is set to the desired temperature or heating level to be produced by heater load 49. At the "0" end of potentiometer 66, the maximum reset voltage is applied to saturable reactor 58 in the reset half cycle of the control voltage. In the control half cycle, the polarity of the applied voltage is such that diode 57 is forward biased, while in the reset half cycle diode 57 is reversed biased. Assuming that the core of saturable reactor 58 is at or near saturation at the end of the previous control half cycle, the application of the maximum value of reset voltage completely resets the core of saturable reactor 58. In the subsequent control or gating half cycle, the core of saturable reactor 58 does not reach saturation and therefore no current is delivered through diode 57 and resistor 56 to the primary winding 54p of low-power gate transformer 54. When the slider of potentiometer 66 is set about midway between the end points, a reset voltage of about one-half the maximum reset voltage is applied to saturable reactor 58 during the reset half cycle. The flux is driven to an intermediate level. This approximately equals the volt-time product applied to saturable reactor 58 for the first 90° of the next control or gating half cycle. Only the exciting current of saturable reactor 58 flows through the primary winding 54p until the core reaches saturation, and since the core preferably is made of a rectangular hysteresis loop material, it goes into saturation abruptly, causing the voltage across it to collapse and producing a rapid increase in the current supplied through primary winding 54p. The gate current pulse is transformed into secondary winding 54s' and conducted through diode 37 and resistor 41 to the gate-cathode circuit of master SCR 12', rendering it conductive. With the slider at the F end of potentiometer 66, the minimum reset voltage is applied to saturable reactor 58 during the reset half cycle. As a consequence, there is only a relatively short delay angle during the next control half cycle before the core of saturable reactor 58 is driven into saturation, coupling the gate current pulse to gate transformer primary winding 54p. Therefore, the gate current pulse for master SCR 12' occurs relatively early in the control half cycle. In each reset half cycle, diode 61 is forward biased and the current through bias winding 54s is effective to reset the core of low-power gate transformer 54. Adjustment of the slider of potentiometer 66 to intermediate points between "0" and "F" provides smooth and reliable control of the firing angle of master SCR 12' over its control range. By closing override switch 71 of the soft start circuit, the full value of the reset voltage is applied to saturable reactor 58 during the reset half cycle regardless as to the setting of potentiometer 66. It will further be noted that blocking diode 37 not only prevents the application of reverse current to the gate electrode of master SCR 12', but also prevents the loading of the gate transformer reset circuit.

Although discussed with regard to a single phase full wave phase control circuit but single phase loads, the circuit is applicable for multiphase operation to supply a polyphase resistive or reactive load. A three-phase version of the FIG. 4 industrial heater phase-controlled circuit, for example, requires only that three of the illustrated control circuits be provided, in which case control voltage supply transformer 55 and power load transformer 46 are each one leg of three-phase transformers. Furthermore, the sliders of the three potentiometers 66 in the three single phase control circuits are ganged together for concurrent adjustment. A single potentiometer 66 and soft-start circuit 67 can be used to control the three half wave control circuits by feeding three-phase half wave rectified voltage to potentiometer 66 through the three diodes 68 from their respective taps on the three control voltage windings 55s', paralleling the lower ends of the three resistors 65 at the potentiometer pointer, and paralleling the lower ends of the three resistors 70 at the output of the soft-start circuit.

In summary, a magnetic slave firing circuit for full wave phase-controlled thyristor circuits has the outstanding feature, for a relatively simple gating circuit, of a small error between the control and slaved gating pulses. For a resistive load, the basic circuit is adequate and comprises a nonlinear inductor that saturates and supplies gating current to the "slave" thyristor to render it conductive at the same phase angle, plus a small error angle, at which the "master" thyristor was rendered conductive in the preceding half cycle by an externally generated gating pulse. For a reactive load such as a power transformer for a heater, undesired reaction between the exciting current of the transformer and the slaved nonlinear inductor is overcome by using the output of the basic slave triggering circuit to supply phase-controlled AC voltage to a gate transformer that selectively delivers gating current to a pair of power thyristors connected to the power transformer. This circuit also has excellent gating characteristics with a small error angle.

While the invention has been particularly shown and described with reference to several preferred embodiments thereof, it will be understood by those skilled in the art that various changes in form and detail may be made therein without departing from the spirit and scope of the invention.

What I claim as new and desire to secure by Letters Patent of the United States is:

1. A magnetically controlled slave gating circuit for high-power inverse-parallel connected solid state switching devices supplying phase-controlled load voltage comprising first and second inverse-parallel connected low-power solid-state switching devices effectively coupled in series circuit relationship with a resistor and the primary winding of a gate transformer between a pair of alternating current control voltage input terminals, a phase-variable gating circuit providing control gating pulses to render conductive said first low-power switching device at a selected phase delay angle in one half cycle of the control voltage, a nonlinear inductor with a saturable core effectively coupled across the load terminals of said low-power switching devices so as to be reset by the control voltage during the phase delay angle before said first low-power switching device conducts, and coupling means for applying the slaved gating pulse developed when said nonlinear inductor saturates in the other half cycle of the control voltage to render conductive said second low-power switching device at approximately the same phase delay angle, said gate transformer further having a pair of secondary windings each connected to the gating circuit of one of the high-power switching devices, said gating circuits each including blocking means for coupling to the respective highdpower switching devices only one polarity of the alternating current phase control gating signals generated in said gate transformer by the alternately conducting low-power switching devices, said gate transformer having a saturable core to limit the duration of the phase control gating signals supplied to the gating circuits of the high-power switching devices, and voltage-limiting means for clipping the alternating current phase control gating signals, said low-power switching devices being gate controlled thyristors, and a resistor effectively connected in series circuit relationship with said nonlinear inductor across the load terminals of said low-power switching devices, said coupling means comprising a blocking diode connected to the junction of said resistor and nonlinear inductor for applying current flowing through said nonlinear inductor to the gate-cathode circuit of said second low-power switching device, and an extra winding on said nonlinear inductor effectively connected between the gate and cathode of said second low-power switching device to apply a bias voltage thereto in the phase delay interval before said nonlinear inductor saturates, said phase-variable gating circuit for said first low-power switching device comprising a current transformer having a secondary winding effectively connected with a blocking diode between gate and cathode of said last-mentioned switching device, a primary winding connected in series with a blocking diode and a saturable reactor across a source of low level gating voltage, a bias winding and a blocking diode also connected across the source of low level gating voltage, and means for applying a variable reset voltage to said saturable reactor comprising a potentiometer, whereby the magnitude of the reset voltage determines the phase delay of the control gating signal.

2. A full wave phase-controlled power circuit including a magnetically controlled slave gating circuit connected to supply phase control gating signals to a pair of inverse-parallel connected high-power solid-state switching devices, and a power transformer having a primary winding connected in series circuit relationship with said inverse-parallel high-power switching devices between a pair of alternating current input terminals, said power transformer having a secondary winding adapted to be connected to a load, wherein said magnetically controlled slave gating circuit comprises first and second inverse-parallel connected low-power solid-state switching devices effectively coupled in series circuit relationship with a resistor and the primary winding of a gate transformer between a pair of alternating current control voltage input terminals, a phase-variable gating circuit providing control gating pulses to render conductive said first low-power switching device at a selected phase delay angle in one half cycle of the control voltage, a nonlinear inductor with a saturable core effectively coupled across the load terminals of said low-power switching devices so as to be reset by the control voltage during the phase delay angle before said first low-power switching device conducts, and coupling means for applying the slaved gating pulse developed when said nonlinear inductor saturates in the other half cycle of the control voltage to render conductive said second low-power switching device at approximately the same phase delay angle, said gate transformer further having a pair of secondary windings each connected to the gating circuit of one of the high-power switching devices, said gating circuits each including blocking means for coupling to the respective high-power switching devices only one polarity of the alternating current phase control gating signals generated in said gate transformer by the alternately conducting low-power switching devices, said phase-variable gating circuit for the first low-power switching device comprising a low-power gate current transformer coupled thereto, means including a saturable reactor for supplying phase-delayed current pulses to said low-power gate transformer, means including a potentiometer for applying a variable reset voltage to said saturable reactor, and means for selectively overriding said potentiometer to fully reset said saturable reactor.

3. A full wave phase-controlled heater control circuit comprising a pair of high-power inverse-parallel connected solid-state switching devices supplying phase-controlled load voltage to a power transformer having a primary winding in series therewith, and a magnetically controlled slave gating circuit for said high-power devices comprising first and second low-power inverse-parallel connected solid-state switching devices effectively coupled in series circuit relationship with a resistor and the primary winding of a saturable gate transformer between a pair of control voltage input terminals, a phase-variable gating circuit providing control signals to render conductive said first low-power switching device at a selected phase delay angle in one half cycle of the control voltage, a nonlinear inductor with a saturable core effectively coupled across the load terminals of said low-power switching devices so as to be reset by the control voltage during the phase delay angle before said first low-power device conducts, and coupling means for applying the slaved gating signal developed when said nonlinear inductor saturates in the other half cycle of the control voltage to render conductive said second low-power switching device at approximately the same phase delay angle, said gate transformer further having a pair of secondary windings each connected to the gating circuit of one of said high-power switching devices, said gating circuits each including blocking means for coupling to the respective high-power switching devices only one polarity of the alternating current phase control gating signals generated in said saturable gate transformer by the alternately conducting low-power switching devices.

* * * * *